Patented Feb. 26, 1935

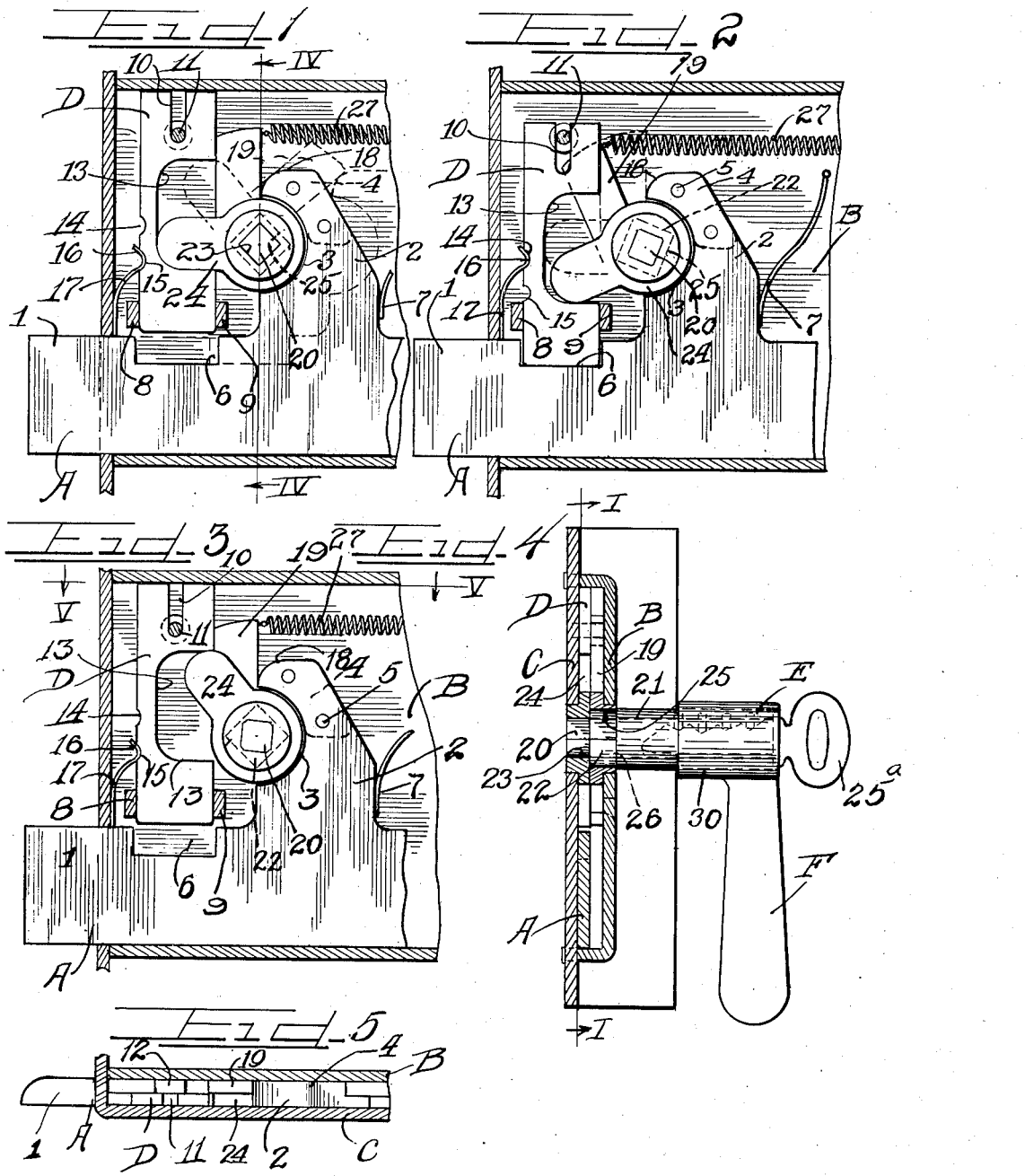

1,992,729

UNITED STATES PATENT OFFICE 1,992,729

AUTOMOBILE DOORLOCK

George L. Weller, Evanston, Ill.

Application April 16, 1934, Serial No. 720,673

6 Claims. (Cl. 70—91)

The present invention relates to automobile door locks, and more particularly to a door lock structure wherein the door may be locked by a movement of the door handle, but which cannot be unlocked, from either the inside or outside, except by a key.

An object of the present invention is to provide a lock structure for automobiles, wherein twisting of the handle will be ineffective to break any of the lock parts, so that a thief, in order to gain entrance to an automobile equipped with the lock of the present invention, must take time to utterly destroy the lock mechanism, or else break the glass of a door, to gain entrance. The time taken to break the lock of the present invention is considerable, which is a deterrent to the casual thief.

Another object of the invention is to provide an automobile door lock structure which may be locked by handle movement, but which requires a key for unlocking.

A still further object of the invention is to provide an automobile door lock structure whereby the chance of theft of the locked car is reduced to a minimum, as the unlocking cannot be accomplished without a key, except by destruction of the lock structure, thereby requiring time, which is a deterrent to automobile thieves.

Another and yet further object of the invention is to provide an automobile door lock structure which cannot be unlocked, from the inside or the outside, except by a key.

A yet further object of the invention is to provide an improved lock structure for automobiles of such nature as to require considerable expenditure of time for breaking the lock structure to a point where the door may be opened, or in lieu of breaking the lock, requiring breaking of a pane of glass to gain entrance.

The above, other, and further objects of the invention will be apparent from the following description, accompanying drawing, and appended claims.

An embodiment of the present invention is illustrated in the accompanying drawing, and the views thereof are as follows:

Figure 1 is a fragmental view of a lock constructed in accordance with the present invention, taken substantially in the plane of line I—I of Figure 4 and looking toward the front plate of the lock casing, and showing the parts in normal position, with a latch projected and unlocked.

Figure 2 is a view similar to Figure 1 with the locking bolt moved into locking engagement with the latch bolt, and showing certain operative elements for effecting the locking of the latch.

Figure 3 is a view similar to Figure 1, showing the parts in position when the locking bolt is moved out of locking engagement with the latch bolt.

Figure 4 is a vertical sectional view taken substantially in the plane of line IV—IV of Figure 1 and Figure 5 is a fragmental horizontal sectional view taken substantially in the plane of line V—V of Figure 3.

The drawing will now be explained.

The invention is herein illustrated in connection with a casing comprising a front plate B, a back plate C, and a latch bolt A. As is usual in such structures, the various parts are made of stampings or pressings and the plates B and C are connected together in operative relation in any suitable manner.

The latch bolt A has an end portion 1 of transverse thickness greater than the thickness of the remainder of the latch. The latch bolt A also is provided with an upstanding part 2 provided with an arcuate recess 3, the thickness of which is augmented by a reinforcement 4 suitably secured, as by rivets, 5 to the part 2 adjacent the recess 3.

The latch bolt A is also provided with a pocket or cut out portion 6, disposed, as shown, in its upper margin between the thickened end 1 and the upstanding part 2.

The latch bolt A is adapted for reciprocal movement, as customary, and is normally maintained in projected or locking position by means of any suitable arrangement, a spring 7 being illustrated for accomplishment of this purpose.

A locking bolt D is disposed within the casing adapted for movement perpendicularly to the direction of movement of the latch bolt A so that it may be moved into and out of the pocket or recess 6 in the latch bolt for locking or unlocking the latch bolt in projected position. The locking bolt D is guided in its movement by means of lugs 8 and 9, arranged one at each side of the lower end of the bolt. The upper end of the bolt is slotted as at 10 and a pin 11 secured in a head 12 attached to the front plate B, enters the slot 10 for guiding the upper end of the bolt. The intermediate portion of the bolt D is cut away as at 13. A margin of the locking bolt is provided with indentations 14 and 15 to be respectively engaged by the bent end 16 of a spring 17, to maintain the locking bolt D in locked or unlocked relation with respect to the latch bolt A. Furthermore the spring 17 serves to prevent rattling of the locking bolt in the lock structure.

The upper portion of the upstanding part 2 of the latch bolt A is formed with a cam face 18 which is engaged by an operating finger or rollback 19 for retracting the latch bolt from its projected position, as will be more fully hereinafter explained.

The means for operating the latch bolt and the locking bolt D comprises a shaft or spindle 26 having a squared inner end 20. A sleeve 21 surrounds the shaft 26 and this also is provided with a squared end 22. The squared ends 20 and 22 are axially spaced from each other with the squared end 20 projecting beyond the squared end 22.

It is to be understood that the use of the term "squared" in connection with the extremities of the shaft 26 and sleeve 21, is used generically, and not by way of limitation, as these ends may be of any other shape than square, as long as the ends are polygonal shaped for interfitting with the operating fingers as will be more fully explained.

The squared end 20 of the shaft 26 engages a similarly shaped opening 23 in a finger or tail piece 24. The finger or tail piece 24 is disposed to lie within the recess 13 of the locking bolt D for actuating it. The squared end 22 of the sleeve 21 engages a similarly shaped opening 25 in the finger or roll-back 19 for oscillating the finger as will be more fully explained.

It will be observed that the finger or tail piece 24 lies against the inner face of the back plate C while the finger 19 lies against the inner face of the front plate B. The members 24 and 19 are provided with suitable shoulders for centering the same in the plates B and C which shoulders serve also as bearings for the shaft and sleeve in the casing.

Within the sleeve 21, adjacent the outer end thereof, is a pin cylinder lock of any known kind, indicated generally at E. The shaft 26 is formed as a part of the lock cylinder. Normally the cylinder lock E serves to lock together the shaft 26 and the sleeve 21 for rotation or oscillation as a unit.

A handle, designated generally at F, has a hub 30 which is press fitted over the outer end of the sleeve 21. The fit is such that for all normal operations, the handle and sleeve are unitary, and move together.

Should a thief endeavor to break the lock structure of the present invention, by applying a pipe or other lever to the handle F, and twisting the handle, the handle will rotate about the sleeve 21 without affecting any of the parts of the lock mechanism and without accomplishing unlocking of the locked door.

A spring 27 is applied to the handle structure to maintain the parts in normal position and may be of any usual form or connected to any of the parts of the handle actuated mechanism for accomplishment of this purpose, and is shown as connected at one end with the finger 19 and is connected at its other end to a part, not shown, of the plate B.

Figure 1 illustrates the arrangement of parts with the latch bolt projected and unlocked. To retract the latch bolt the handle F is moved in such a direction as to swing the finger 19 clockwise, as viewed in Figures 1, 2, and 3 of the drawing, for engaging the cam 18 on the upstanding part 2 of the latch bolt A whereupon the latch bolt will be retracted to dotted line position of Figure 1, and the door may be opened. When the handle is released, the spring 27 returns the parts to normal position whereupon the spring 7 projects the latch bolt A to the normal or full line position of the drawing.

When it is desired to lock the door, the handle F is given rotative movement in the opposite direction whereupon the finger or tail piece 24 is rotated in counter-clockwise direction, as viewed in the drawing, and moves the locking bolt D downwardly into engagement with the pocket or recess 6 in the latch bolt A, as may be observed in Figure 2. During movement of the locking bolt D from unlocked to locked position the notch 14 in the margin of the bolt is brought into engagement with the spring 17, whereupon the bolt is held against retractive movement by this engagement. The engagement of the spring 17 in the notch 15 retains the bolt in unlocked position. After pressure has been released on the handle, after locking the door, the spring 27 returns the fingers 19 and 24 and handle F to normal position, which is the full line position of these parts in Figure 1.

The dotted lines in Figure 2 show the positions of the fingers 19 and 24 after return to normal position of these parts, and while the locking bolt D is in locking engagement with the latch bolt A. In this position it will be observed that the finger 19 is against the end of the cam 18 of the upstanding part 2 of the latch bolt A. Consequently any attempt by movement of the handle and its associated sleeve 21 to swing the finger 19 to the right, that is in clockwise direction, as viewed in Figure 2, will be prevented, because of the engagement of the locking bolt D with the latch bolt A which, locks the latch bolt in projected position. In order to release the latch bolt A from locking engagement by the locking bolt D, the latter must be raised. As long as the locking bolt D is in locking engagement with the latch bolt A, any effort to turn the spindle to retract the locking bolt D will be opposed by contact of the finger 19 against the part 2 of the latch bolt, and because the two parts of the spindle structure are connected together for unitary movement. The interlocking of the spindle parts thereby prevents unlocking of the locking bolt D by any attempt to rotate the spindle.

The cylinder lock E normally locks together the sleeve 21 and the shaft 26, as heretofore described. Because of this locking together, unlocking of the door is prevented for the reasons just mentioned. To unlock the door, a key 25a is inserted in the cylinder lock E and turned to unlock the connection between the sleeve 21 and the shaft 26. Further movement of the key 25a will then rotate the shaft 26 only, in clockwise direction as viewed in Figures 1, 2, and 3, to move the finger or tail piece 24 from the dotted line position of Figure 2 to the full line position of Figure 3, which thereupon moves the locking bolt D out of engagement with the notch or pocket 6 in the latch bolt A thereupon unlocking the latch bolt. The key 25a must then be returned to position to withdraw it from the lock which returns the finger or tail piece 24 to proper angular relationship with respect to the finger 19, and locks the sleeve 21 to the shaft 26, as the key is withdrawn whereupon the handle F may be manipulated to swing the finger piece 19 clockwise and retract the latch bolt for opening the door.

An automobile thief will, if he cannot break the door lock, ordinarily break the glass of the locked door to open the door from the inside. Inasmuch as the lock of the present invention cannot be unlocked from the inside, the thief would have to break the glass of another door to gain entrance to the car. Then, if he could drive the car, he would have two broken windows in the car, a fact which should attract attention of the police. The breaking of the two windows might rouse the neighborhood, with likely apprehension of the thief or else scare him away from the attempted theft.

The movement of the handle has, in some of the claims, been described with reference to its "normal" position. By "normal" position is meant the position usually occupied by a handle.

The invention has been described herein more or less precisely as to details, yet it is to be understood that the invention is not to be limited thereby, as changes may be made in the arrangement and proportion of parts, and equivalents may be substituted, without departing from the spirit and scope of the invention.

I claim as my invention:

1. In an automobile door lock structure, a normally projected latch bolt, means operable by the outside door handle for retracting said latch bolt to open the door, means operable by the outside door handle for locking said latch bolt in projected position, and key actuated means operable through said outside handle for releasing said locked latch bolt, the parts being so constructed and related that said locked latch bolt cannot be released from inside or outside the door except by said key actuated means.

2. In an automobile door lock structure including a latch bolt, a spindle, an outside door handle for actuating said spindle, a roll-back member on said spindle adapted to retract said latch bolt when said handle is rotated in one direction, a locking bolt movable into locking engagement with said latch bolt by movement of said handle in counter direction to lock said latch bolt in projected position, and key operated means for withdrawing said locking bolt from locking engagement with said latch bolt, said key operated means constituting the sole means in said lock structure for moving said locking bolt out of locking engagement with said latch bolt.

3. An automobile door lock structure including in combination, an outside door handle, a latch bolt, means operable by said handle for retracting said latch bolt, a locking bolt, other means also operable by said handle for moving said locking bolt into locking engagement with said latch bolt, and key operated means for moving said locking bolt out of locking engagement with said latch bolt, said key operated means constituting the sole means in said lock structure for moving said locking bolt out of locking engagement with said latch bolt.

4. In an automobile door lock, in combination, a latch bolt, means for maintaining said latch bolt normally in projected position, a locking bolt adapted to be moved into and out of locking engagement with said projected latch bolt, a finger adapted to retract said latch bolt, a second finger adapted to move said locking bolt into and out of engagement with said latch bolt, a shaft engaging said second finger for actuating it, a sleeve about said shaft engaging said first finger for actuating it, means normally locking said shaft and sleeve together for unitary movement, a handle on said sleeve, movement of said handle in one direction from normal position causing retraction of said latch bolt by said first finger and movement of said handle in the opposite direction from normal position causing movement of said locking bolt by said second finger into locking engagement with said latch bolt, said latch bolt having a part engageable by said first finger to prevent retraction of the latch bolt when said locking bolt is in engagement with said latch bolt, said last mentioned part preventing movement of said first finger in a direction to retract the latch bolt, means for unlocking said shaft and sleeve and for rotating said shaft relatively to said sleeve to actuate said second finger for the movement of said locking bolt out of locking engagement with said latch bolt without moving said first finger, the engagement of said latch bolt part with said first finger preventing unlocking of said lock structure by handle movement and preventing unlocking of said lock structure without releasing the locked engagement of said shaft and sleeve.

5. In an automobile door lock structure, in combination, a latch bolt, a locking bolt adapted for locking engagement with said latch bolt, means for retracting said latch bolt, means for moving said locking bolt, a spindle structure for actuating said means, said spindle structure comprising two concentrically arranged relatively movable parts, one of said parts being operatively connected with said first mentioned means, the other of said relatively movable parts being operatively connected with the second of said mentioned means, means connecting said parts together for unitary movement to move the locking bolt into locking engagement with said latch bolt and for disconnecting said parts for relative movement to withdraw the locking bolt from said latch bolt.

6. In an automobile door lock structure, in combination with a latch bolt, a locking bolt adapted for locking engagement with said latch bolt, means for retracting said latch bolt, means for moving said locking bolt, a spindle structure consisting of relatively movable parts for actuating said means, one of said parts being adapted to actuate said first means, the other of said parts being adapted to actuate said second means, means normally connecting said spindle parts together for unitary movement to move said locking bolt into locking engagement with said latch bolt and operable for disconnecting said spindle parts whereby said other part may then be actuated relatively to said one part to move said locking bolt out of locking engagement with said latch bolt.

GEORGE L. WELLER.